INVENTOR.
FRANCIS R. ROGERS
BY
AGENT

INVENTOR.
FRANCIS R. ROGERS
BY
AGENT

June 15, 1965  F. R. ROGERS  3,188,807
VARIABLE TORQUE TRANSMITTING MECHANISM FOR
A RE-EXPANSION GAS TURBINE
Filed Oct. 5, 1962  5 Sheets-Sheet 5

FIG. 7

| | 1 | 2 | 3 | 4 | 5 | 6 |
|---|---|---|---|---|---|---|
| OPERATING POSITION | ENGINE START. | STEADY STATE VEHICLE ON LEVEL ROAD. | REDUCED POWER – VEHICLE DESCENDING HILL AT CONSTANT SPEED. | VEHICLE DECELERATION FROM CONDITION 2 ABOVE. | VEHICLE STATIONARY ENG. IDLING | ACCELERATION FROM CONDITION 5 ABOVE. |
| $N_p$ | 0 | 60% | 60% | 60% | 0 | UNDER 10% |
| $N_G$ | 10.40% | 80% | 56% | 62% | 50% | REQUEST 80% |
| $P_N$ | 0 | 60 | 120 | 180 | 160 | 0 |
| PUMP-MOTOR 50 STROKE. | 0 | +95% | 0 | -100% | 0 | 0 |
| MOTOR-PUMP 54 STROKE POSITION. | +100% | +62% | 0 | -60% | -40% | +100% |
| ACCUMULATOR PRESS. $P_s$. | 0 | 500 | 3250 | 3500 | 3250 | DECREASING FROM 3000 |
| POSITION OF — | LEVER 88. | SOLID LINE POSITIONS SHOWN – FIG. 1. APPROX. DOTTED LINE POSITION SHOWN – FIG. 1. | +4% | -12% | -10% | +4% |
| POSITION OF — | LEVER 100. | SOLID LINE POSITIONS SHOWN IN FIG. 4 | OFF STOP 112. | AGAINST STOP 112. | AGAINST STOP 112 | AGAINST STOP 112 | OFF STOP 112 |
| POSITION OF — | STEM 122. | | FULL RIGHT AS VIEWED IN FIG. 1. | TO LEFT PARTIALLY COMPRESSING SPRING 120. | TO LEFT AGAINST SPRING 120. | TO LEFT COMPRESSING SPRING 120 APPROX. ONE-HALF. | TOWARD RIGHT AS ACCUM. PRESS. $P_s$ DECREASES |
| POSITION OF — | TUBULAR MEMBER 102. | | NOT COLLAPSED. | PARTIALLY COLLAPSED. | COLLAPSED ALMOST FULLY. | PARTIALLY COLLAPSED | NOT COLLAPSED. |
| POSITION OF VALVE 158 FIGURE 4. | SOLID LINE POSITION. | DOTTED LINE POSITION. | DOTTED LINE POSITION. | DOTTED LINE POSITION. | DOTTED LINE POSITION. | SOLID LINE POSITION. |
| FUEL FLOW SCHEDULE FIGURE 5. | 2400°R. ACCEL. CURVE. | 2160°R. CURVE. | 2160°R. CURVE. | BELOW STEADY STATE NO EXTRACTION CURVE. | STEADY STATE – NO POWER EXTRACTION CURVE. | 2400°R. ACCELERATION CURVE. |
| SPEED ERROR % | + | +.2 | -.6 | -.12 | -.10 | 10 |

INVENTOR.
FRANCIS R. ROGERS.
BY
AGENT.

United States Patent Office 3,188,807
Patented June 15, 1965

3,188,807
VARIABLE TORQUE TRANSMITTING MECHA-
NISM FOR A RE-EXPANSION GAS TURBINE
Francis R. Rogers, South Bend, Ind., assignor to The Bendix Corporation, South Bend, Ind., a corporation of Delaware
Filed Oct. 5, 1962, Ser. No. 228,641
8 Claims. (Cl. 60—39.16)

This invention relates in general to a control system for controlling the operation of a gas turbine engine having a gas producer turbine and a power turbine and, in particular, relates to a fuel control for controlling fuel flow to the engine and a variable torque transmitting mechanism operatively connected to the gas producer turbine and the power turbine to thereby effect a controlled transfer of power between the two turbines.

The application of small gas turbine engines to use in ground vehicles, and stationary power plants where a variable output torque is required has indicated a number of disadvantages in existing modes of controlling the operation of the engine which preclude obtaining maximum engine efficiency. Among these disadvantages are established limitations on the temperature of the gas entering the gas producer turbine and poor specific fuel consumption. In the past, the usual mode of controlling torque output of the power turbine has been to control the fuel flow to the combustion chamber in accordance with operating parameters of the gas producer turbine, the operating limitations of which, such as turbine speed, turbine inlet temperature and compressor pressures are related to the torque required to drive the air compressor. The limitations established by the above mentioned parameters of operation have a corresponding effect on the power turbine which is driven by the gas exhausted from the gas producer turbine.

It is therefore an object of the present invention to provide control mechanism for a gas turbine engine wherein a transfer of torque between a gas producer turbine and a power turbine is accomplished by a variable torque transmitting mechanism.

It is another object of the present invention to provide a control mechanism for a gas turbine engine having separate gas producer turbine and power turbines which realizes improved engine efficiency at substantially all power output levels.

It is still another object of the present invention to provide control mechanism for a gas turbine engine adapted to produce a variable output torque for use in driving a vehicle.

It is an important object of the present invention to provide control mechanism for a gas turbine engine wherein a transfer of torque is transferred between a gas producer turbine and a power turbine according to a predetermined schedule of engine operation by a variable torque transmitting hydraulic mechanism.

Various other objects and advantages of the present invention will be apparent to those skilled in the art from the following description taken in conjunction with the attached drawings wherein:

FIGURE 7 is a chart which is self-explanatory by virtue of the labels therein listing six various representative conditions of operation and the corresponding positions occupied by various levers which control the pump-motor 50 and motor-pump 54 in response to variable fluid pressures $P_S$ and $P_N$.

Figure 1:
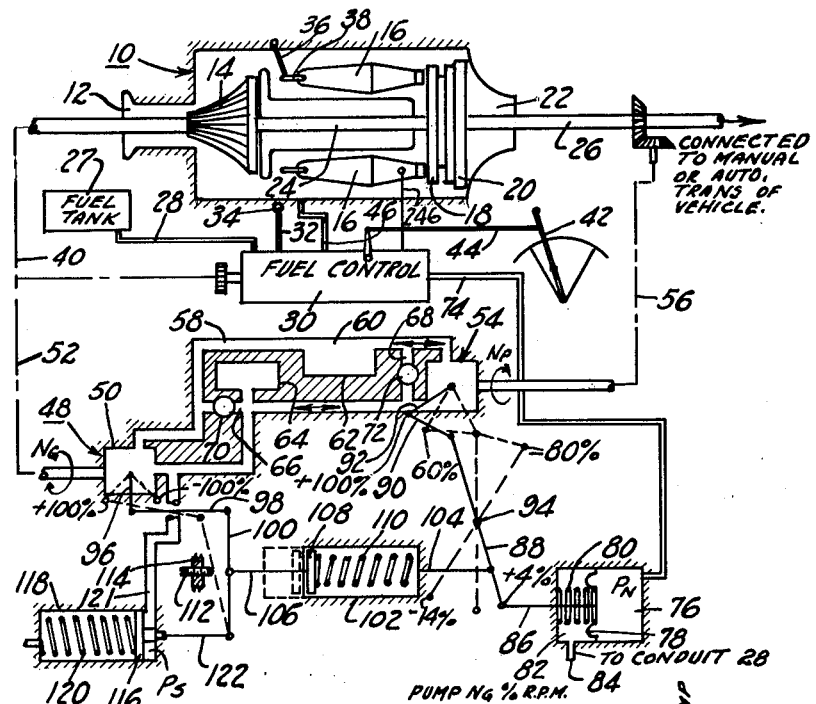
FIGURE 1 represents in schematic form a gas turbine engine and control mechanism therefor embodying the present invention.
Figure 3:
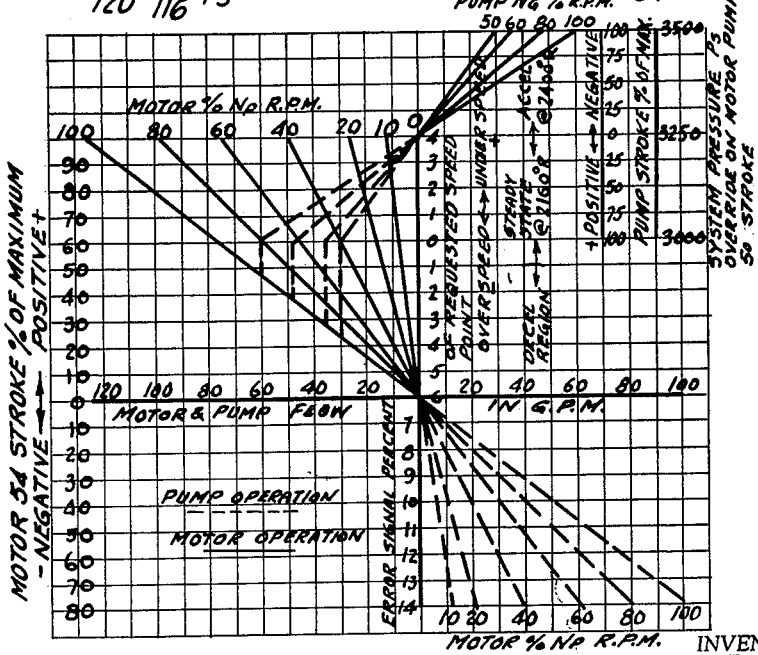
FIGURE 3 is a graph showing plots of various parameters of engine operations which are labeled accordingly.

Referring to FIGURE 1, numeral 10 designates a gas turbine engine having an air inlet 12 leading to a compressor 14, which exhausts pressurized air to combustion chambers 16 wherein a mixture of fuel and air is burned to produce hot motive gases which flow through a gas producer turbine 18, thence through a power turbine 20 from which the gas exhausts through outlet 22 to the atmosphere. While the gas exhausted by the power turbine is shown as vented directly to the atmosphere it will be understood that the exhaust gas may be vented instead to a heat regenerator, not shown, which recovers a portion of the heat of the exhaust gases and transfers the recovered heat to the entering air upstream from the combustion chambers 16 and which subsequently vents the exhaust gas to the atmosphere.

The gas producer turbine 18 is mechanically coupled to and drives the compressor 14 via a shaft 24 suitably journaled in bearings, not shown. The power turbine 20 is coupled to a shaft 26 from which an output torque is realized.

Fuel is supplied to the combustion chambers 16 from a fuel tank 27 via a conduit 28 leading to the inlet of a fuel control 30 having an outlet conduit 32 which communicates with an annular fuel manifold 34 which, in turn, supplies pressurized fuel to fuel lines 32 and associated fuel nozzles 38. The operation of fuel control 30 and thus fuel flow to the combustion chamber 16 is controlled as a function of the speed of turbine 18 via a suitable shaft and gearing arrangement generally indicated by 40, as a function of the position of a throttle lever 42 via suitable linkage 44, and as a function of compressor discharge pressure $P_c$ via conduit 46.

The gas producer turbine 18 and the power turbine 20 are coupled via torque transmitting hydraulic mechanism generally indicated by 48 which includes a variable displacement hydraulic pump-motor 50 driven by turbine 18 via a suitable shaft and gear arrangement 52 and a hydraulic motor-pump 54 driven by power turbine 20 via a suitable shaft and gear arrangement 56. The hydraulic pump-motor 50 and motor-pump 54 are connected via a conduit 58 communicating with an oil sump 60 and via a conduit 62 communicating with a hydraulic pressure accumulator 64. Conduit 58 communicates with conduit 62 via passages 66 and 68 having check valves 70 and 72, respectively, therein for a purpose to be explained hereinafter.

The stroke of the hydraulic motor-pump 54 is varied as a function of a fuel pressure $P_n$ derived from the fuel control 30 as will be described hereinafter. A conduit 74 is connected to supply fuel at pressure $P_n$ from control 30 to a chamber 76 partially defined by a diaphragm 78 against which a predetermined pre-load derived from a spring 80 is applied in opposition to the fluid pressure $P_n$. The spring 80 is assisted by fuel at pump inlet pressure $P_0$ which is supplied to diaphragm 78 via a chamber 82 and a conduit 84 connected to inlet conduit 28. A stem 86 fixedly secured to diaphragm 78 is pivotally secured to one end of a lever 88, the other end of lever 88 being pivotally secured to a lever 90 which, in turn, has its opposite end pivotally secured to a lever 92 connected to the swash plate of the hydraulic motor-pump 54. The lever 88 is mounted to pivot about a fixed point 94 in response to movement of diaphragm 78.

The stroke of the pump-motor 50 is varied by a lever 96 having one end pivotally secured to one end of a lever 98; the opposite end of lever 98 being pivotally secured to one end of a lever 100. A collapsible link connected to levers 88 and 100 includes a tubular member 102 provided with a stem 104 fixedly secured thereto and extending therefrom into pivotal engagement with lever 88. A stem 106 pivotally secured at one end to lever 100 extends through one end of tubular member 102 and is fixedly secured at its opposite end to a circular plate 108 slidably contained in tubular member 102. A spring 110 interposed between the closed end of tubular member 102 and plate 108 serves to bias the plate 108 into engagement with the opposite end of tubular member 102. The lever 100 is adapted to engage an adjustable stop member 112 threadedly engaged with a fixed support 114.

A piston 116 slidably carried in a cylinder 118 is biased toward one end of the cylinder by a spring 120 against a fluid pressure $P_s$ acting on the opposite side of piston 116, which fluid pressure is termed "system pressure" in the following description and is supplied to cylinder 118 via a conduit 121 leading from conduit 62. A stem 122 fixedly secured to piston 116 extends through one end of cylinder 118 into pivotal engagement with an end of lever 100.

Figure 2:
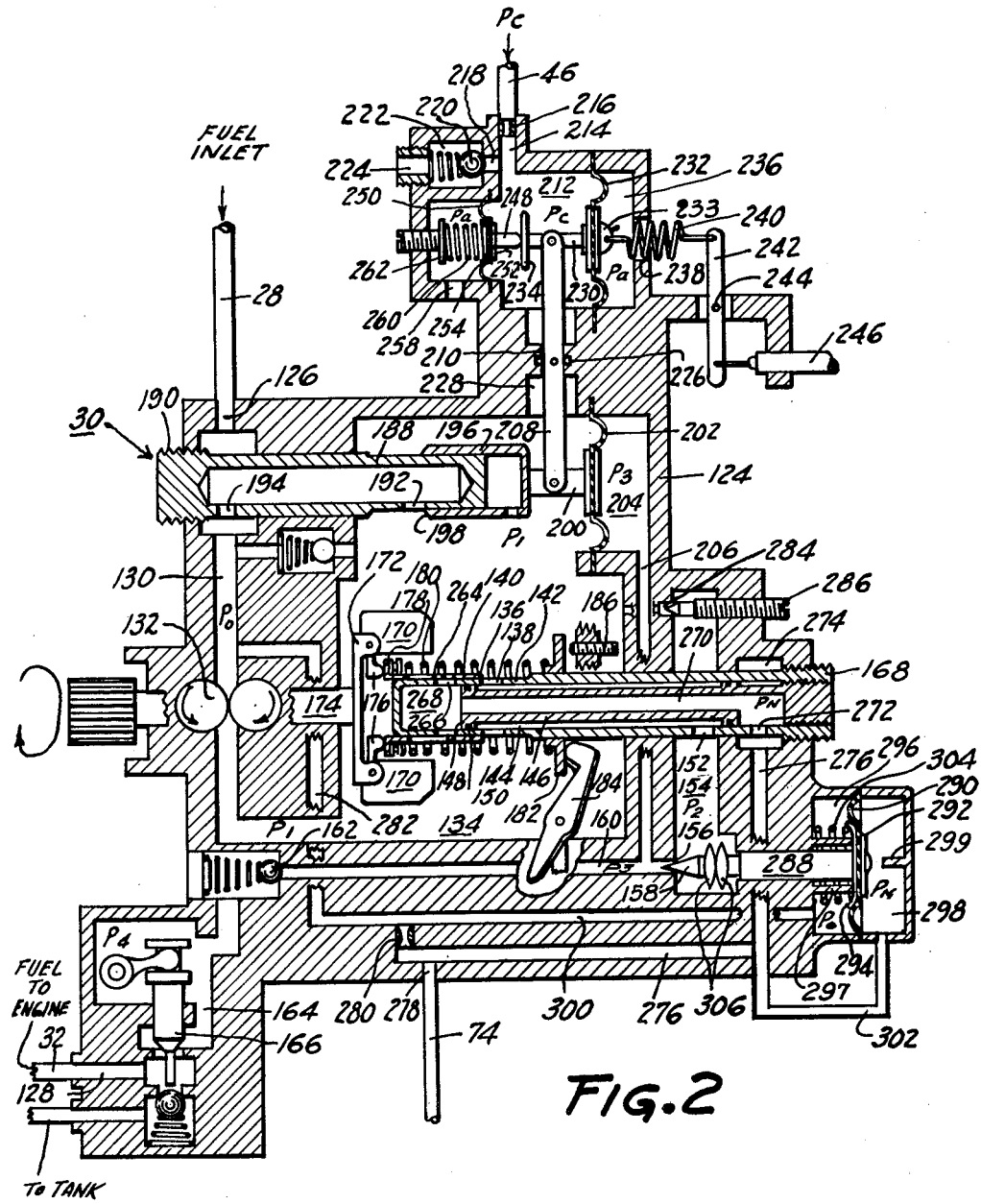
FIGURE 2 is a sectional view of the fuel control shown in block form and labeled accordingly in FIGURE 1.

Referring to FIGURE 2, which discloses the fuel control 30 of FIGURE 1 in sectional view, numeral 124 designates a casing having an inlet port 126 connected to inlet conduit 28 and an outlet port 128 connected to outlet conduit 32. Fuel flows from the inlet port 126 through a conduit 130 having a positive displacement gear type fuel pump 132 arranged therein. The fuel at fuel pump discharge pressure $P_1$ flows to a chamber 134, then past a beveled edge portion 136 and port 138 in governor valve sleeve members 140 and 142, respectively, which beveled edge portion 136 and port 138 coact to form a variable flow area. The port 138 opens into an annular chamber 144 defined by a tubular member 146 having enlarged diameter end portions 148 which engage the inner surface of sleeve member 142 and which are provided with O ring seals or other suitable means 150 that form a fluid seal. From chamber 144 fuel flows through a port 152 in sleeve member 142 to a passage 154 then through a variable area restriction 156 controlled by a valve 158 then through a passage 160, a check valve 162, and a conduit 164 containing a fuel cut-off valve 166.

The sleeve member 142 is provided with a threaded end 168 threadedly engaged with casing 124 which maintains sleeve member 142 and thus port 138 associated therewith in a fixed position. The sleeve member 140 is slidably carried on sleeve member 142 and is actuated axially to thereby vary the position of beveled edge portion 136 associated therewith relative to port 138 as a function of throttle lever 42 position and compressor speed N. A pair of centrifugal speed weights 170 pivotally secured to a support 172 rotatably driven by shaft 174 as a function of engine speed is provided with arms 176 which bear against a radially outwardly extending flanged portion 178 of sleeve member 140; the flanged portion 178 being fixed rotationally and acting as a thrust bearing surface for the weights 170. The force of the weights 170 acts in opposition to the force derived from a compression spring 180 interposed between the flanged portion 178 and a spring retainer 182 slidably carried on sleeve member 142. A lever 184 actuated by the throttle lever 42 serves to bias the spring retainer 182 toward or away from speed weights 170 thereby varying the force applied against arms 176 as a function of the position of the throttle lever 42. An adjustable stop member 186 threadedly engaged with casing 124 is adapted to engage spring retainer 182 thereby imposing a minimum limit on the force derived from spring 180 irrespective of throttle lever position.

The fuel pressure differential $P_1-P_3$ between chamber 134 upstream from ports 136 and 138 and passage 160 downstream from variable area restriction 156 is controlled by a by-pass valve which includes a tubular member 188 closed at opposite ends and provided with screw threads 190 which threadedly engage casing 124 thereby fixedly securing the tubular member 188 in position. The tubular member 188 is provided with a port 192 which communicates chamber 134 with the interior of tubular member 188 at fuel pump inlet pressure $P_0$. The area of port 192 is varied as a function of compressor discharge air pressure $P_c$, atmospheric air pressure $P_a$ and combustion chamber inlet temperature T by a cup-shaped member 196 slidably carried on tubular member 188 and provided with a beveled edge portion 198 which registers with port 192 to vary the area thereof in response to movement of cup-shaped member 196. A stem 200 fixedly secured at one end to cup-shaped member 196 is fixedly secured at its opposite end to a diaphragm 202 which has one side exposed to chamber 134 at fuel pressure $P_1$ and an opposite side exposed to fuel pressure $P_3$ in a chamber 204. A passage 206 communicates chamber 204 with passage 160 downstream from restriction 156. A lever 208 pivotally secured to stem 200 extends through an opening 210 in casing 124 into a chamber 212 which receives compressor discharge air at pressure $P_c$ from conduit 46 via a passage 214 containing a restriction 216. A normally closed vent passage 218 is controlled by a spring loaded relief valve 220 which opens in response to a predetermined maximum allowable value of pressure $P_c$ to thereby vent chamber 212 to a chamber 222 which, in turn, is vented to the atmosphere via a port 224. An O ring seal 226 is contained in a recess 228 in casing 124 and serves to prevent fluid flow through opening 210.

The position of the cup-shaped member 196 and thus flow through by-pass port 192 is determined by the position of lever 208, one end of which is pivotally secured to stem 200 and the opposite end of which is pivotally secured to a stem 230. The stem 230 is fixedly secured at one end to a diaphragm 232 by any suitable means, including a spring retaining member 233, and at the opposite end is provided with a flattened portion 234. The radially outermost portion of diaphragm 232 is securely attached to casing 124 by any suitable means, not shown. The diaphragm 232 separates chamber 134 from a chamber 236, the latter chamber being vented to atmospheric air pressure $P_a$ via an opening 238. A tension spring 240 is connected at one end to spring retaining member 233 and at the opposite end to one end of a lever 242. The lever 242 is pivotally mounted on a support 244 fixedly secured to casing 124 and is connected at one end to mechanism generally indicated by 246 responsive to combustion chamber inlet temperature T. The flattened portion 234 of stem 230 is adapted to engage a movable abutment 248 fixedly secured to a diaphragm 250 by any suitable means, such as a back-up washer 252 and spring retaining member 254, between which the central portion of the diaphragm 250 is clamped. The diaphragm 250 is exposed on one side to the pressure $P_c$ in chamber 212 and on the opposite side to the atmosphere via a port 258. A pre-load is imposed on diaphragm 250 by a spring 260 interposed between spring retaining member 254 and an adjustable spring-retaining member 262 threadedly engaged with casing 124.

The governor valve sleeve members 140 and 142 are provided with axially extending ports 264 and 266, respectively, which coact in a manner to be described hereinafter to provide the fuel pressure signal $P_n$ for actuating the diaphragm 78 which in turn, controls the stroke of the hydraulic motor 54. From the ports 264 and 266, fuel at pressure $P_n$ flows through a chamber 268 adjacent the closed end of sleeve member 142, thence through a passage 270 in tubular member 146 and a port 272 in sleeve member 142 to an annular chamber 274 in casing 124 from which the fuel flows to a passage 276 which, in turn, communicates with a port 278 to which conduit 74 is connected. The passage 276 communicates through a restriction 280 with a passage 282 leading to conduit 130 at pump inlet pressure $P_0$.

A passage 284 connected between passage 154 and chamber 134 provides for a predetermined minimum flow of fuel to the engine. An adjustable valve member 286 threadedly engaged with casing 124 cooperates with passage 284 and may be adjusted to effect desired minimum fuel flow.

The valve member 158 is provided with a stem 288 slidably carried in casing 124 and fixedly secured at one end to a diaphragm 290 by any suitable means including backing plates 292 and 294. The diaphragm 290 has its radially outermost portion secured to casing 124 by any suitable means, not shown, and separates a chamber 296 from a chamber 298 and is responsive to the fuel pressure differential $P_n$–$P_0$ therebetween. Stops 297 and 299 in chambers 296 and 298, respectively, are secured to casing 124 and serve to limit the range of movement of diaphragm 290 and thus valve member 158 thereby establishing a corresponding minimum and maximum area of restriction 156. A passage 300 communicates chamber 296 with passage 282 at pressure $P_0$ and a passage 302 communicates chamber 298 with passage 276 at pressure $P_n$. A spring 304 interposed between casing 124 and backing plate 292 serves to pre-load diaphragm 290 in a direction to open valve member 158. The valve member 158 is secured to stem 288 by temperature responsive capsules 306 which expand and contract with an increase and decrease, respectively, in temperature of the fuel in passage 154 to thereby effect a corresponding change in the position of valve member 158.

Figure 6:
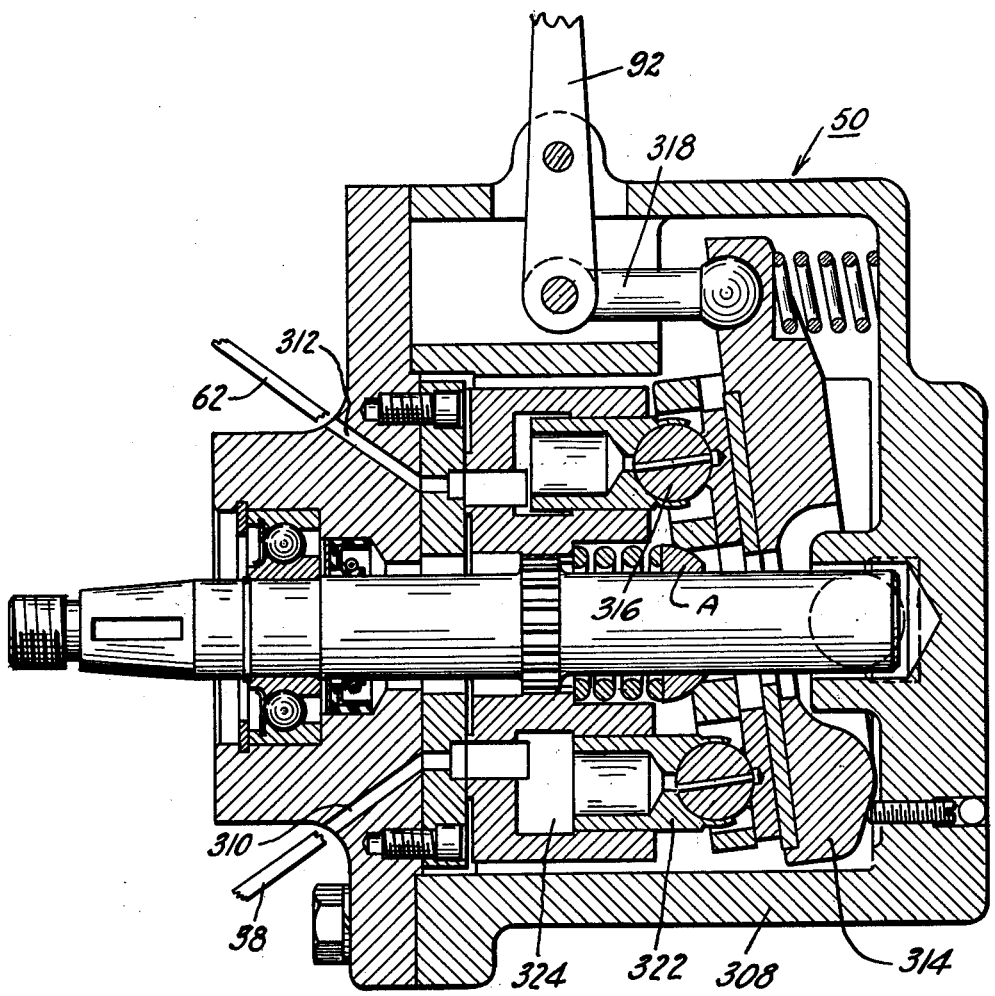
FIGURE 6 is a schematic sectional representation of a motor-pump unit.

Referring to FIGURE 6, the hydraulic pump-motor 50 of FIGURE 1 is shown in more detail. It will be understood that the hydraulic motor-pump 54 is identical to hydraulic pump-motor 50 such that FIGURE 6 is representative of both units 50 and 54. The pump-motor 50 is of conventional construction and includes a casing 308 having inlet and outlet ports 310 and 312, respectively, connected to conduits 58 and 62. A swash plate 314 mounted on spherical supports 316 is tilted about an axis A by an arm 318 pivotally secured at one end to the swash plate. The lever 92 or the lever 96 is pivotally secured to the opposite end of arm 318 thereby positioning the arm 318 and attached swash plate 314 of the pump-motor 50 or motor-pump 54 as a function of the position of lever 92 or 96, respectively. The swash plate 314 is tiltable through + and − ranges of positions which correspond to operation as a pump and motor, respectively, as hereinafter described. The transition from operation as a pump to operation as a motor is effected by actuating the swash plate 314 through a zero stroke position as indicated in FIGURE 6. Pistons 322 carried in cylinders 324 are pivotally secured to swash plate 314 by means of a conventional ball and socket mechanism generally indicated by 326 and move through a predetermined stroke as determined by the angle of tilt of the swash plate 314. Of course, each of the pump-motors 50 and 54 may be replaced by a separate pump and motor suitably connected hydraulically if space and weight considerations are not critical.

The pump-motor 50 can operate as a pump when the swash plate is positioned in a + range or as a motor when the swash plate is positioned in a negative − range. Operating as a pump under certain conditions, the unit 50 extracts energy from the gas producer turbine 18 and transfers this energy to the power turbine motor-pump 54. Operating as a motor under certain conditions the unit 50 can absorb energy from the power turbine motor-pump 54. When the gas producer turbine 18 underspeed error as represented by pressure $P_n$ is +4% or greater, the swash plate 314 is positioned in a zero pump stroke position. Underspeed errors between +4% and 0 as represented by pressure $P_n$ result in actuation of the swash plate to vary the pump stroke from 0 to +100%. The position of the swash plate 314 may be overriden by the system pressure override which includes piston 116 whenever the hydraulic system pressure $P_s$ exceeds a predetermined value. When operating as a motor, the stroke of the pump-motor 50 is controlled between 0 and −100% by the system pressure override only.

The motor-pump 54 differs from the above mentioned pump-motor 50 only in the manner in which the position of its swash plate 314 is scheduled. Motor-pump 54 operates as a motor in the entire underspeed + range and also a portion of the overspeed − range from 0 to −6% speed error with a motor stroke of 100% at +4% error and 0 stroke at −6% error. Whenever the overspeed signal is between −6% and −14% speed error, the swash plate 314 is positioned causing motor-pump 54 to act as a pump. A speed error between −6% and −14% as represented by pressure $P_n$ establishes a pump stroke between 0 and 80%.

Operation

For the purpose of facilitating explanation of operation of the present invention, it will be understood that the gas turbine engine 10 is the power plant of a vehicle such as an automobile, not shown, wherein the power turbine 20 is connected to the driving wheels of the vehicle through conventional automatic or manually operated power transmission apparatus, not shown, under control of the vehicle operator. It will be understood that the position of the throttle lever 42 and thus speed of turbine 18 may vary to provide a desired vehicle speed depending upon the load, road conditions, etc. to which the vehicle is exposed.

With the above mentioned transmission in a neutral position the engine 10 is started with conventional starting apparatus, not shown, which rotates the compressor 14 and turbine 18 to a predetermined speed whereby the mass air flow to the combustion chambers 16 is sufficient to support combustion of the fuel injected into the chambers 16 and render the engine self-sustaining in operation. Assuming the throttle lever 42 to be set at idle position and the speed of the compressor 14 and turbine 18 increasing toward the selected idle speed; the force of centrifugal weights 170 will be overcome by the force of spring 180 causing sleeve 140 to occupy a position whereby port 138 is opened allowing fuel to flow therethrough to the metering valve 158 from which it flows to the combustion chambers 16 and port 266 is closed thereby causing a decrease in fuel pressure $P_n$ which is transmitted to the diaphragms 78 and 290. The drop in fuel pressure $P_n$ represents a high underspeed signal and, referring to FIGURE 1, results in actuation of lever 88 and attached lever 92 to the positions represented in solid line form and labeled +4% and +100% position, the lever 92 positions the swash plate 314 of motor-pump 54 to establish a maximum stroke of motor-pump 54 which, as heretofore pointed out, operates as a motor in the underspeed range. The position of lever 88 is transmitted via link 104, cylinder 102 and link 106 to lever 100 which assumes a position represented by solid line form whereby attached lever 96 controls the swash plate 314 of pump-motor 50 to a 0 stroke position. Thus, as the speed of compressor 14 and turbine 18 increases toward the selected idle speed, the turbine 18 is not loaded by pump-motor 50 and rapid acceleration of compressor 14 and turbine 18 is attained.

Figure 4:
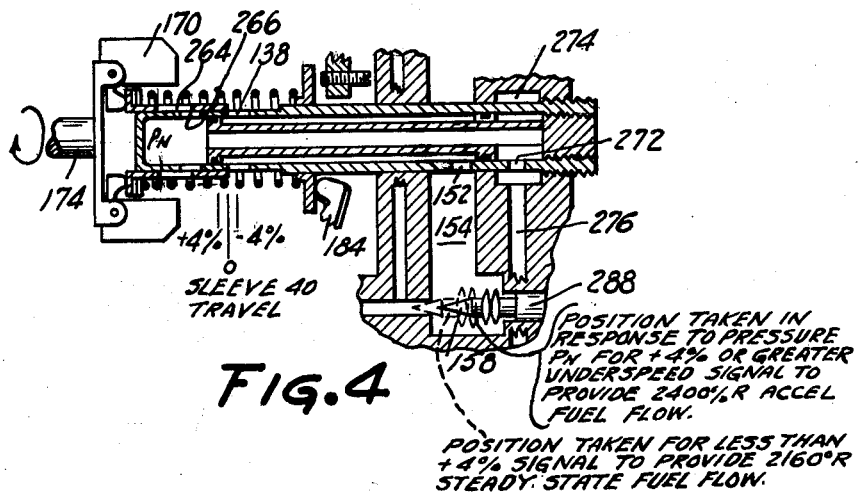
FIGURE 4 is a broken away portion of FIGURE 2 showing the range of positions occupied by certain of the fuel flow control elements.
Figure 5:
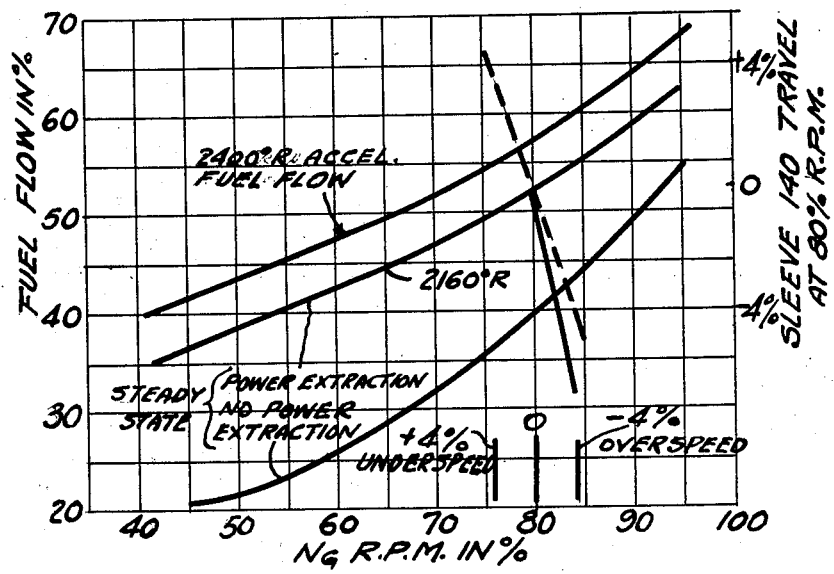
FIGURE 5 is a graph showing plots of certain engine operating conditions which are labeled accordingly.

As the turbine 18 approaches the selected idle speed, the force of centrifugal weights 170 overcomes the spring 180 and sleeve 140 moves toward tubular member 146 causing an increase in fuel pressure $P_n$ which indicates a decreasing speed error. Referring to FIGURE 4, it will be noted that three positions of sleeve 140 are shown and labeled as +4%, 0, −4% which correspond to an underspeed error, no speed error, and an overspeed error, respectively. The axially extending port 264 is made longer than the adjacent port 266 to permit port 266 to remain fully open from the −4% position of sleeve 140 to a position of sleeve 140 where port 138 in governor valve sleeve member 142 is closed by the beveled edge portion 136 in sleeve 140. As the force of centrifugal weights 170 increases, the sleeve 140 reaches the +4% speed error position shown in FIGURE 4 at which time the fuel pressure $P_n$ which increases as a function of the increasing area of port 266 causes diaphragm 78 to move against the force of spring 80, thereby actuating lever 88 in a clockwise direction, as viewed in FIGURE 1, to effect a decrease in the stroke of motor-pump 54. At the same time, lever 88 causes movement of lever 100 in a counterclockwise direction as viewed in FIGURE 1 whereupon the stroke of pump-motor 50 is increased in a positive direction increasing the output of pump-motor 50. Assuming that the automatic or manually operated drive transmission is positioned in neutral, the energy derived from pump-motor 54 as represented by an increase in system pressure $P_s$ in conduit 62 acts to drive motor-pump 54 which, in turn, transmits the energy to power turbine 20 causing an increase in speed thereof.

The system pressure $P_s$ increases as a result of the increasing stroke of pump-motor 50 and reaches a predetermined value, which for description purposes may be considered to be 3,000 p.s.i., whereupon the pressure $P_s$ acting against piston 116 overcomes the force of spring 120 causing lever 100 to pivot clockwise as viewed in FIGURE 1 thereby causing a decrease in the stroke of pump-motor 50. Since the decrease in the stroke of pump-motor 50 results in a decrease in load on the turbine 18, the turbine 18 continues to accelerate beyond the requested idle speed thereby creating an overspeed condition. This overspeed condition results in movement of sleeve 140 beyond the 0 speed error point labeled in FIGURE 4 by virtue of the force of weights 170 overcoming the load of the spring 180. Since fuel pressure $P_n$ varies in accordance with the effective area of port 266 as a result of movement of sleeve 140, the overspeed condition is reflected by an increase in pressure $P_n$. Upon reaching an overspeed condition of −6% speed error, the system pressure $P_s$ has increased to say 3250 p.s.i. whereupon the clockwise actuation of lever 100 has caused the swash plate 314 of pump-motor 50 to enter the − position range wherein pump-motor 50 operates as a motor. At the same time, the increase in fuel pressure $P_n$ has acted against diaphragm 78 causing clockwise movement of lever 88 and corresponding actuation of the swash plate 314 of motor-pump 54 into the − position range wherein motor-pump 54 operates as a pump. Conventional fuel governing operation now occurs by virtue of the sleeve member 140 reducing the area of port 138 which, in turn, reduces fuel flow to the combustion chambers causing the speed of turbine 18 to stabilize at the requested idle speed which the speed corresponds to approximately 50% maximum engine speed and could fall within the aforementioned −6% to −14% speed range. The output of motor-pump 54, now acting as a pump, feeding into the pump-motor 50 loads the system to a point of equilibrium, in other words, until the energy extracted by the pump-motor 50 and the governed fuel flow reaches a balance condition. Since the energy absorbed by the turbine 20 is not utilized at this time to drive the wheels of the vehicle, the turbine 20 would overspeed if the motor-pump 54 was not operating as a pump with its output dissipated by pump-motor 50 which drives the turbine 18 and compressor 14. Engine operation will stabilize at the requested idle speed until the automatic or manually operated drive transmission is shifted into a drive position at which time sufficient torque will be available to move the vehicle.

Forward motion of the vehicle is accomplished by actuation of the throttle lever 42 from idle position corresponding to approximately 50% maximum engine speed, for example, to a position corresponding to 80% engine speed, for example, which, in turn, results in spring 180 overcoming the force of centrifugal weight 170. The resulting movement of sleeve 140 produces an increase in area of port 138 and a decrease in area of port 266 and a corresponding increase in fuel flow, as well as a decrease in pressure $P_n$. The fuel pressure $P_n$ will indicate a speed error which is greater than the aforementioned +4%. As before, the fuel pressure $P_n$ will actuate diaphragm 78 causing attached lever 88 to pivot counterclockwise thus positioning the swash plate 314 of motor-pump 54 in the + position range where the motor-pump 54 operates as a motor with a +100% stroke. Also, the lever 100 attached to lever 88 is pivoted counterclockwise thus returning the swash plate 314 of pump-motor 50 to the 0 stroke position. As a result, pump-motor 50 does not extract energy from the turbine 18 which reduces the load on turbine 18 allowing the same to accelerate rapidly toward the selected speed.

The decreased fuel pressure $P_n$ which represents a speed error in excess of +4% acts against diaphragm 299 in opposition to spring 304 and fuel pressure $P_0$ and allows metering valve 158 to move in an opening direction to a position whereby the increase in effective flow area thereof causes an increase in fuel flow to the combustion chambers 16. The increase in fuel flow causes a corresponding increase in the temperature of the gases exhausted from the combustion chambers 16 to the turbine 18 to a predetermined value which for description purposes may be considered to be a permissible acceleration temperature 2400° R. which temperature is defined herein as turbine in temperature $T_i$.

The hydraulic pressure accumulator 64 is a conventional pressure storing mechanism well known to those skilled in the art and serves to accumulate the excess pressure energy available whenever the pump-motor 50 or motor-pump 54 is operating as a pump. The stored pressure energy is transferred to the hydraulic system whenever pressure $P_s$ falls below the accumulator charged level. With the pump-motor 50 operating at 0 stroke, the pressure $P_s$ will tend to fall to the level at which the accumulator 64 is charged, whereupon the accumulator 64 will discharge into the conduit 62 maintaining sufficient pressure $P_s$ to actuate motor-pump 54 which is operating as a motor with a +100% stroke. Thus, even though the energy extracted from the turbine 18 is lost when the pump-motor 50 stroke is returned to 0, the total energy supplied to the power turbine 20 is increased.

With the pump-motor 50 load removed from the turbine 18, the turbine 18 accelerates rapidly thereby effecting a decrease in the underspeed speed error. When the underspeed speed error reaches +4% as mentioned heretofore the increase in fuel pressure $P_n$ actuates diaphragm 78 causing the motor-pump 54 stroke to decrease from the +100% value and the pump-motor 50 stroke to increase from the 0 value. Also, the increase in fuel pressure $P_n$ actuates diaphragm 299 causing metering valve 158 to move toward a closed position thereby decreasing the flow of fuel through passage 160 to the combustion chamber 16 to thereby effect a reduction in the turbine in temperature $T_i$ to 2160° R. The turbine 18 continues to accelerate but at a slower rate by virtue of the pump-motor 50 extracting energy from the turbine 18 and the reduction in fuel flow to the chambers 16. The output of pump-motor 50 being in excess of that which the motor-pump 54 can absorb, by virtue of the vehicle speed still being at a relatively low value, causes the system pressure $P_s$ to rise rapidly. The excess pressure is absorbed by the accumulator. As the system pressure $P_s$ rises and exceeds the aforementioned 3,000 p.s.i., the piston 116 responds to the pressure $P_s$ causing lever 100 to pivot clockwise thereby effecting a reduction in the stroke of pump-motor 50 toward the 0 value. Since the reduction in stroke of pump-motor 50 results in a reduction of load on the turbine 18, the turbine 18 will tend to overspeed whereupon the sleeve 140 is positioned by the force of weights 170 which overcomes spring 180 causing a reduction in fuel flow through port 136 which tends to stabilize turbine 18 speed. The turbine in temperature $T_i$ decreases as a result of the decrease in fuel flow and falls below the aforementioned 2160° R. The turbine 18 speed error signal represented by fuel pressure $P_n$ decreases at which time the fuel pressure $P_n$ acts to position diaphragm 78 to thereby establish a scheduled fuel flow which corresponds to the required 2160° R. turbine inlet temperature $T_i$ under steady state operation. It will be understood that the vehicle road speed continues to increase although the speed of turbine 18 approaches stabilization since power is being transmitted from turbine 18 to turbine 20 via pump-motor 50 and motor-pump 54. Stable operation is reached when the full output of motor-pump 50 is absorbed by pump-motor 54.

To decelerate the engine from the selected 80% speed, the throttle lever 42 is actuated to the position corresponding, for example, to a 60% engine speed. The overspeed error is in excess of −14% and the force of spring 180 is overcome by the force of weights 170 causing the sleeve 140 to move in a direction to close port 136 which, in turn, causes a drop in fuel flow to the combustion chambers 16. The movement of sleeve 140 also effects an increase in area of port 266 thereby causing an increase in pressure $P_n$. The pressure $P_n$ acting through diaphragm 78 causes lever 88 to pivot colckwise thereby actuating the swash plate 314 of pump-motor 54 in the + range where pump-motor 54 operates as a pump. The movement of lever 88 also actuates cylinder 102 and attached lever 100, the latter moving in a counterclockwise direction, thereby effecting a maximum stroke +100% of pump-motor 50. The increase in stroke of pump-motor 50 causes the system pressure $P_s$ to increase to approximately 3250 p.s.i. which, being above the 3,000 p.s.i. required to actuate piston 116, displaces piston 116 causing lever 100 to pivot clockwise thereby effecting a reduction in stroke toward 0 of pump-motor 50. The deceleration rate of the turbine 18 is increased by virtue of the added load of pump-motor 50. The motor-pump 54 now operating as a pump absorbs energy from the power turbine 20 and causes an increase in system pressure $P_s$ above 3250 p.s.i. whereupon the rise in pressure $P_s$ acts against piston 116 causing further movement of lever 100 and subsequent movement of its swash plate 314 into the − range of positions where pump-motor 50 operates as a motor. The piston 116 continues to respond to the pressure $P_s$ which increases as a function of the energy supplied by motor-pump 54 and increases the stroke of pump-motor 50 toward −100%. Thus, the energy supplied by the turbine 20 in driving motor-pump 54 is transferred to pump-motor 50 driving turbine 18 and compressor 14. In the event that the pump-motor 50 cannot absorb the energy supplied by motor-pump 54, the relief valve 72 opens at a pressure $P_s$ of approximately 3500 p.s.i. allowing excess pressure $P_s$ to flow to the sump 62. The vehicle continues at the maximum rate of deceleration until the energy level derived from motor-pump 54 cannot maintain the system pressure $P_s$ above 3250 p.s.i. The turbine 18 speed decreases toward the selected 60% speed. As the selected 60% speed is approached, the force of centrifugal weights 170 decreases and sleeve 140 is biased by spring 180 causing an increase in area of port 138 and a decrease in area of port 266 which, in turn, establishes an increase in fuel flow to the engine and a decrease in pressure $P_n$, respectively. The decrease in pressure $P_n$ acts upon diaphragm 78 causing the lever 88 to pivot counterclockwise and reduce the stroke of motor-pump 54 which, in turn, reduces the pressure $P_s$. Upon decreasing to a value signifying an overspeed error of less than 6%, the pressure $P_n$ in acting against diaphragm 78 causes lever 88 to actuate swash plate 314 of motor-pump 54 to the + range positions whereby the operation of motor-pump 54 is reversed causing it to operate as a motor. Since energy is no longer supplied to the system by pump-motor 54, the accumulator 64 releases its stored energy as pressure $P_s$ decreases. The pressure $P_s$ continues to drop thereby causing rightward movement of piston 116 and counterclockwise movement of lever 100 attached thereto. When pressure $P_s$ decreases below 3250 p.s.i., the lever 100 moves accordingly causing the swash plate 314 of pump-motor 50 to move into the + range of positions wherein pump-motor 54 imposes a load upon turbine 18 which further reduces the overspeed error which, in turn, acting through sleeve 140 effects a further reduction in pressure $P_n$. At zero speed error, the governor sleeve 140 is stabilized by a balance condition between the force of weights 170 and spring 180. Accordingly, fuel flow is regulated to maintain the requested 60% speed. Fuel pressure $P_n$ acting against diaphragm 290 causes valve 158 to assume the position indicated in dashed outline in FIGURE 4 thereby establishing a fuel flow which provides a 2160° R. inlet temperature at turbine 18. Engine operation stabilizes as the full output of pump-motor 50 is absorbed by the motor-pump 54.

During the above described sequence of operation, the fuel pressure differential $P_1-P_3$ between chamber 134 and passage 160 is regulated continuously by the by-pass valve cup-shaped member 196 which controls the area of by-pass port 192 in response to movement of lever 208. An increase in pressure $P_c$ causes an increase in the pressure differential $P_c-P_a$ across diaphragm 232 which, in turn, establishes a corresponding load on lever 208 which pivots clockwise, as viewed in FIGURE 2, causing member 196 to reduce the flow area of port 192 thereby reducing the by-pass fuel flow. As a result of the reduced by-pass flow, pressure $P_1$ will increase causing an increase in fuel pressure differential $P_1-P_3$ which acts on diaphragm 202 which, in turn, loads lever 208 in opposition to the load derived from diaphragm 232. The lever 208 is stabilized in response to the oppositely acting forces acting through their respective lever arms thereby maintaining the fuel pressure differential $P_1-P_3$ at a constant value for a given pressure differential $P_c-P_a$. The pressure differential $P_1-P_3$ is modified as a function of combustion chamber inlet temperature T through the action of tension spring 240. Maximum tension of spring 240 and a corresponding maximum force which augments the force derived from pressure differential $P_c-P_a$ is attained with a cold engine when combustion chamber temperature T is at a minimum. The augmenting force of tension spring 240 results in a higher pressure differential $P_1-P_3$ and produces a greater flow of fuel to the combustion chamber 16.

The movable abutment 248 serves to preload the lever 208 during start operation of the engine when the pressure differential $P_c-P_a$ is substantially zero. When pressure $P_c$ and $P_a$ are equal, the spring 260 will have a maximum loading effect against lever 208 which, in turn, biases member 196 in a closing direction to reduce by-pass flow to a minimum during start operation. As pressure $P_c$ increases, the pressure differential across diaphragm 250 increases and the resulting force acting in opposition to spring 260 serves to reduce the loading effect of spring 260 against lever 208. At a predetermined pressure differential $P_c-P_a$ corresponding to a selected speed of the compressor 14, the abutment 248 is stabilized in response to equal and opposite forces derived from diaphragm 250 and spring 260 whereupon the flattened portion 234 moves out of engagement with abutment 248 at which time the load applied to lever 208 becomes a function of pressure differential $P_c-P_a$ and combustion chamber inlet temperature T only. As shown in FIGURE 2, the spring retaining member 262 may be adjusted for calibration purposes to vary the effect of spring 260 on lever 208.

Various changes and modifications of the structure disclosed in the drawings and described heretofore may be

I claim:

1. Control apparatus for a gas turbine engine having a combustion chamber, an air compressor for supplying pressurized air to the combustion chamber, an output torque producing shaft, a pair of independently rotating turbines operatively connected to the air compressor and output shaft, respectively, for driving the same, and a control lever for controlling the operation of the engine, said control apparatus comprising:
   a fuel conduit connected to supply pressurized fuel to the combustion chamber;
   means responsive to the speed of the compressor;
   first valve means operatively connected to said fuel conduit, said compressor speed responsive means and the control lever for controlling fuel flow through said conduit to the combustion chamber as a function of the position of the control lever and compressor speed;
   first variable stroke fluid pump-motor means operatively connected to the compressor turbine and communicating with a source of fluid;
   second variable stroke fluid pump-motor means operatively connected to the output torque producing shift and communicating with said source of fluid;
   means responsive to a condition of engine operation which varies with engine power output operatively connected to said first and second fluid pump-motor means for controlling the stroke of each of the same in response to certain predetermined variations in said condition of engine operation;
   said first fluid pump-motor means being operative to pressurize the fluid at said source which, in turn, drives said second fluid pump-motor means to thereby effect a controlled transfer of energy from said compressor driving turbine to said output torque producing shaft under substantially steady state operation of the compressor as indicated by said condition of engine operation;
   said second fluid pump-motor means being operative to pressurize the fluid at said source which, in turn, drives said first fluid pump-motor means to thereby effect a controlled transfer of energy from the torque producing shaft to the compressor turbine under a decelerating condition of the compressor as indicated by said condition of engine operation; and
   said first fluid pump-motor means being rendered inoperative as a pump to thereby unload the compressor driving turbine under an accelerating condition of said compressor as indicated by said condition of engine operation.

2. Control apparatus for a gas turbine engine as claimed in claim 1 wherein:
   said condition of engine operation which varies with engine power output is compressor speed.

3. Control apparatus as claimed in claim 1 wherein said fluid pressure source includes:
   a fluid pressure accumulator for supplying pressure to drive said second fluid pump-motor when said first fluid pump-motor means is rendered inoperative as a pump.

4. Control apparatus for a gas turbine engine having a combustion chamber, an air compressor for supplying pressurized air to the combustion chamber, an output torque producing shaft, a pair of independently rotating turbines operatively connected to the air compressor and output shaft, respectively, and a control lever for controlling the operation of the engine, said control apparatus comprising:
   a fuel conduit connected to supply pressurized fuel to the combustion chamber;
   means responsive to the speed of the compressor;
   first valve means operatively connected to said fuel conduit, said compressor speed responsive means and the control lever for controlling fuel flow through said conduit to the combustion chamber as a function of the position of the control lever and compressor speed;
   second valve means responsive to a first condition of engine operation which varies with engine power output operatively connected to said fuel conduit for controlling the fuel pressure differential across said first valve means as a function of said first condition of engine operation;
   first variable stroke fluid pump-motor means operatively connected to the compressor driving turbine and communicating with a source of fluid;
   second variable stroke fluid pump-motor means operatively connected to the output torque producing shaft and communicating with said source of fluid;
   means responsive to a second condition of engine operation which varies with engine power output operatively connected to said first and second fluid pump-motor means for controlling the stroke of each of the same in response to certain predetermined variations in said second condition of engine operation;
   said first fluid pump-motor means being operative to pressurize the fluid at said source which, in turn, drives said second fluid pump-motor means to thereby effect a controlled transfer of energy from the compressor driving turbine to the ouptut torque producing shaft under substantially steady state operation of the compressor as indicated by said second condition of engine operation;
   said second fluid pump-motor means being operative to pressurize the fluid at said source which, in turn, drives said first fluid pump-motor means to thereby effect a controlled transfer of energy from the output torque producing shaft to the compressor driving turbine under a decelerating condition of the compressor as indicated by said second condition of engine operation; and
   said first fluid pump-motor means being rendered inoperative as a pump to thereby unload the compressor driving turbine under an accelerating condition of the compressor as indicated by said second condition of engine operation.

5. Control apparatus for a gas turbine engine as claimed in claim 4 wherein:
   said second valve means is responsive to compressor discharge air pressure.

6. Control apparatus for a gas turbine engine as claimed in claim 4 wherein:
   said second valve means is responsive to combustion chamber inlet temperature.

7. Control apparatus for a gas turbine engine having a combustion chamber, an air compressor for supplying pressurized air to the combustion chamber, an output torque producing shaft, a pair of independently rotating turbines operatively connected to the air compressor and output torque producing shaft, respectively, and a control lever for controlling the operation of the engine, said control apparatus comprising:
   a fuel conduit connected to supply pressurized fuel to the combustion chamber;
   means responsive to the speed of the compressor;
   first valve means including first and second variable area flow restrictions operatively connected to said fuel conduit, said compressor speed responsive means, and the control lever;
   said first restriction being operative to control the flow of fuel through said fuel conduit to the combustion chamber as a function of the position of the control lever and compressor speed;
   said second restriction being operative to control a flow of fuel to a fluid chamber thereby establishing a control fuel pressure therein which varies as a predetermined function of the position of the control lever and compressor speed;

first variable stroke fluid pump-motor means operatively connected to the compressor driving turbine and communicating with a source of fluid;

second variable stroke fluid pump-motor means operatively connected to the output torque producing shaft and communicating with said source of fluid;

fluid pressure responsive means operatively connected to said first and second fluid pump-motor means and responsive to said control fuel pressure for controlling the stroke of each of said first and second fluid pump-motor means as a function of the position of the control lever and compressor speed;

said first fluid pump-motor means being operative to pressurize the fluid at said source which, in turn, drives said second fluid pump-motor means to thereby effect a controlled transfer of energy from the compressor driving turbine to the output torque producing shaft under substantially steady state operation of the compressor as indicated by said control fuel pressure;

said second fluid pump-motor means being operative to pressurize the fluid at said source which, in turn, drives said first fluid pump-motor means to thereby effect a controlled transfer of energy from the output torque producing shaft to the compressor driving turbine under an overspeed condition of the compressor as indicated by said control fuel pressure; and said first fluid pump-motor means being rendered inoperative as a pump to thereby unload the compressor driving turbine under an underspeed condition of the compressor as indicated by said control fuel pressure.

8. Control apparatus for a gas turbine engine as claimed in claim 7 and further including variable area valve means in series flow relationship with said first restriction for controlling the flow of fuel through said fuel conduit to the combustion chamber; and fluid pressure responsive means responsive to said control fluid pressure and operatively connected to said variable area valve means for controlling the position of said valve means.

References Cited by the Examiner

UNITED STATES PATENTS

| 2,656,675 | 10/53 | Coar | 60—13 |
|---|---|---|---|
| 2,802,334 | 8/57 | Fletcher | 60—39.16 |
| 2,986,872 | 6/61 | Budzich | 103—162 |
| 3,025,668 | 3/62 | Mock | 60—39.25 |
| 3,066,488 | 12/62 | Mock | 60—39.25 |

FOREIGN PATENTS 723,368  2/55  Great Britain.

SAMUEL LEVINE, *Primary Examiner*.

UNITED STATES PATENT OFFICE
CERTIFICATE OF CORRECTION

Patent No. 3,188,807 June 15, 196

Francis R. Rogers

It is hereby certified that error appears in the above numbered patent requiring correction and that the said Letters Patent should read as corrected below.

Column 5, line 12, for "an" read -- any --; column 6, 1: 19, for "80%" read -- -80% --; column 9, line 27, for "colck\ read -- clockwise --.

Signed and sealed this 18th day of January 1966.

(SEAL)
Attest:

ERNEST W. SWIDER
Attesting Officer

EDWARD J. BRENNE
Commissioner of Patents